US006925403B2

(12) United States Patent
Nowak

(10) Patent No.: US 6,925,403 B2
(45) Date of Patent: Aug. 2, 2005

(54) METHOD AND SYSTEM FOR CALIBRATING A SENSOR

(75) Inventor: Michael P. Nowak, Milwaukee, WI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 10/662,653

(22) Filed: Sep. 15, 2003

(65) Prior Publication Data

US 2005/0057647 A1 Mar. 17, 2005

(51) Int. Cl.$^7$ .................................................. H04N 7/00
(52) U.S. Cl. ............................................................ 702/94
(58) Field of Search ............................ 702/94; 701/45; 29/832, 740, 833, 823; 250/311; 358/154, 3; 600/407; 348/129; 382/225, 154; 700/273; 40/361; 392/72; 399/72

(56) References Cited

U.S. PATENT DOCUMENTS

| | | |
|---|---|---|
| 4,179,696 A | 12/1979 | Quesinberry et al. |
| 4,625,329 A | 11/1986 | Ishikawa et al. |
| 4,985,835 A | 1/1991 | Sterler et al. |
| 5,051,751 A | 9/1991 | Gray et al. |
| 5,074,583 A | 12/1991 | Fujita et al. |
| 5,229,943 A | 7/1993 | Eigler et al. |
| 5,256,904 A | 10/1993 | Tohbaru |
| 5,366,241 A | 11/1994 | Kithil |
| 5,398,185 A | 3/1995 | Omura |
| 5,413,378 A | 5/1995 | Steffens, Jr. et al. |
| 5,446,661 A | 8/1995 | Gioutsos et al. |
| 5,490,069 A | 2/1996 | Gioutsos et al. |
| 5,528,698 A | 6/1996 | Kamei et al. |
| 5,850,469 A | 12/1998 | Martin et al. |
| 5,890,085 A | 3/1999 | Corrado et al. |
| 5,983,147 A | 11/1999 | Krumm |
| 6,005,958 A | 12/1999 | Farmer et al. |
| 6,018,693 A | 1/2000 | Blackburn et al. |
| 6,026,340 A | 2/2000 | Corrado et al. |
| 6,116,640 A | 9/2000 | Tanaka et al. |
| 6,198,998 B1 | 3/2001 | Farmer et al. |
| 6,272,411 B1 | 8/2001 | Corrado et al. |
| 6,459,974 B1 * | 10/2002 | Baloch et al. ................ 701/45 |
| 6,577,936 B2 | 6/2003 | Farmer |
| 6,662,093 B2 | 12/2003 | Farmer |
| 2003/0016845 A1 | 1/2003 | Farmer |
| 2003/0031345 A1 | 2/2003 | Farmer |
| 2003/0123704 A1 | 7/2003 | Farmer et al. |
| 2003/0133595 A1 | 7/2003 | Farmer et al. |
| 2003/0135346 A1 | 7/2003 | Farmer et al. |
| 2003/0234519 A1 | 12/2003 | Farmer |

FOREIGN PATENT DOCUMENTS

| | | |
|---|---|---|
| GB | 2 236 419 A | 4/1991 |
| JP | 61-66905 | 4/1986 |
| JP | 61-66906 | 4/1986 |
| WO | WO 02/30717 | 4/2002 |

OTHER PUBLICATIONS

PCT International Search Report (4 pages).

(Continued)

Primary Examiner—John Barlow
Assistant Examiner—Tung Lau
(74) Attorney, Agent, or Firm—Rader, Fishman & Grauer PLLC

(57) ABSTRACT

A new system and method for calibrating the field-of-view of a sensor that is part of a vehicle occupancy sensing system. Calibration is carried out by generating an image of the vehicle interior and then identifying within the image at least one distinctive feature of the vehicle interior. The location of the distinctive feature(s) identified in the image are then compared to a set of reference points for a plurality of different sensor positions. The presumed sensor position that corresponds to the set of reference points that most closely match the location of the identified distinctive feature(s) is then presumed to estimate the actual position of the sensor.

27 Claims, 3 Drawing Sheets

OTHER PUBLICATIONS

Borgefors, Gunilla; "Hierarchical Chamfer Matching: A Parametric Edge Matching Algorithm"; IEEE Transactions On Pattern Analysis And Machine Intelligence; IEEE Inc., New York; vol. 10, No. 6, Nov. 1988; pp. 849–865; XP002114858.

Cobzas, Dana, et al.; "Image–Based Localization With Depth–Enhanced Image Map"; PROC2003 Int.; IEEE Conf. Robotics and Automation; vol. 2, Sep. 14, 2003; pp. 1570–1575, XP010667213.

Horn, Joachim, et al.; "Localization Of A Mobile Robot By Matching 3D–Laser–Range–Images And Predicted Sensor Images"; Intelligent Vehicles '94 Symposium, Paris, Oct. 24, 1994; pp. 345–350; XP010258393.

Zingaretti, P. et al.; "Image Segmentation For Apperance-–Based Self–Localisation"; 11th International Conference On Image Analysis And Processing; Sep. 26, 2001; pp. 113–118; XP010561233.

Dudek, Gregory, et al.; "Vision–Based Robot Localization Without Explicit Object Models"; Proceedings of the 1996 IEEE International Conference on Robotics And Automation; Minneapolis, MN; Apr. 22–28, 1996; pp. 76–82; XP010162733.

Greg Welch and Gary Bishop, "An Introduction to the Kalman Filter," Sep. 4, 1997.

"GPS–Based Vehicle Tracking" by Jeffrey Pusan from www.securitydriver.com/aic/stories/article–97.com.

* cited by examiner

METHOD AND SYSTEM FOR CALIBRATING A SENSOR

FIELD OF THE INVENTION

The present invention relates generally to a system and method for calibrating the field-of-view of a sensor (collectively a "calibration system"), and more specifically, to a new system and method for calibrating the field-of-view of a sensor that is part of an automated application.

BACKGROUND OF THE INVENTION

Due to rapid advances in sensor technology and computer science, automated systems are being put to new and increasingly sophisticated uses. Although automated systems are generally superior to human beings in traits such as speed and precision, human beings typically outperform automated systems in the application of contextual information and "human" experience to the interpretation of sensor data. For example, an automated system may falsely conclude that a human being no longer occupies a seat in a vehicle because the person sitting in the seat is in the process of pulling a sweater off over their head, leaving the head temporarily hidden from view. Automated systems in such a context are significantly less adept then even a young child. Various technologies are being developed to improve the ways in which automated systems interpret sensor data in various contexts. It would be desirable to enhance the success of those technologies by improving the technology for calibrating the sensor used to capture the sensor information for the automated system.

There are many different types of applications for which it could be advantageous for an automated system to accurately identify relevant information regarding sensor data. One example of an automated system using sensor information in a fully automated fashion is an "intelligent" safety restraint application in a vehicle that uses digital video footage to determine whether or not the deployment of an airbag should be precluded based upon the type of occupant and/or the proximity of the occupant to the deploying airbag. Many vehicle manufacturers are beginning to incorporate various forms of vehicle occupancy sensing (VOS) systems within the interior of the vehicle. Many of such systems utilize non-image based sensor information such as weight or acceleration (as measured by an accelerometer). Some VOS applications are using visual images of the seat area to make occupancy determinations. A small digital sensor or other form of sensor can be mounted within the interior of the vehicle. Such a sensor is typically capable of generating an image of the passengers sitting in the front seats of the vehicle, along with their immediate surroundings. By analyzing one or more successive images generated by the sensor, the VOS system can determine the presence and location of vehicle occupants, their general size, and even their movement upon sudden deceleration of the vehicle. This data can then be utilized to control "smart" or "intelligent" airbag systems. For example, the VOS system may determine that the vehicle occupant in the front passenger seat is smaller than a predefined size, and is thus presumably a child or a small adult. Subsequently, the airbag system may deactivate the passenger side airbag as deployment of the airbag could result in more harm than good to a relatively small occupant.

The above-described vehicle occupancy sensing (VOS) systems traditionally function by comparing images taken by the sensor to certain reference data maintained in the system. In order for this process to be successful, the system must know the spatial position and rotational orientation of the sensor in relation to the interior of the vehicle. Without this information, the system may be unable to accurately process the images acquired by the sensor. Ideally, both the spatial position and rotational orientation of the sensor are known upon its installation into the vehicle. However, due to translational and rotational tolerances in the installation process, the spatial position of the sensor may vary, for example, by ±10 mm in one or more of the three spatial axes. Similarly, installation tolerances may cause the rotational or angular orientation of the sensor to vary, for example, by ±5° degrees in one or more of the three angular axes. Beyond variations induced during the installation process, the spatial position and rotational orientation of the sensor is subject to change simply due to the everyday use of the vehicle. This is especially due to the rather harsh environment that vehicles are subject to, ranging from vibrations induced by the motor to sudden jolts to the structure of the vehicle due to varying road conditions.

These variances in the spatial positioning and rotational orientation of the sensor can be taken into account in order for vehicle occupancy sensing (VOS) systems and other sensor-based automated systems to function properly. As a VOS system must acquire a relatively large image within a very short distance, it typically utilizes a sensor having a wide-angle lens. However, as a result of using such a wide-angle lens, even small variations in the spatial position or angular rotation of the sensor can lead to significant variations in the sensor's field of view. For example, consider a VOS system whose sensor generates a digital image comprised of 640 by 480 pixels. A 5° degree variation in the angular orientation of the sensor could result in up to a 125 pixel shift in the image. As a result of this pixel shift in the sensor field of view, the effectiveness of the position and classification processes utilized by the VOS system can be severely degraded. Accordingly, a method and system to automatically calibrate the field of view of a sensor is needed so that the processes used by the VOS systems can be accurately adjusted to take into account arbitrary translational and angular displacements of the sensor.

The calibration system is not limited to vehicle safety restraint applications or even occupant sensing systems. Other examples of automated applications that can incorporate the functionality of the calibration system includes security devices, navigation technologies, medical instruments, and virtually any other application that involves functionality being provided in response to an image originating from sensor information. The calibration system can even be used in relation to sensors that are not imaged-based. For example, an ultrasound sensor generates an image, but the ultrasound sensor is not a light-based sensor.

SUMMARY OF THE INVENTION

The present invention relates to a new system and method for calibrating the field-of-view of a sensor (collectively "sensor calibration system," the "calibration system," or simply the "system). The calibration system captures an image of an area of space (an "observed area") and then identifies within the image at least one distinctive feature within the image. One or more distinctive features can then be used by the system to transform the image of the observed area (a "test image") into a digital distance image that can be compared to a "map" of the observed area. With the benefit of the comparison, the calibration system can calibrate the sensor accordingly.

DETAILED DESCRIPTION

Figure 1:
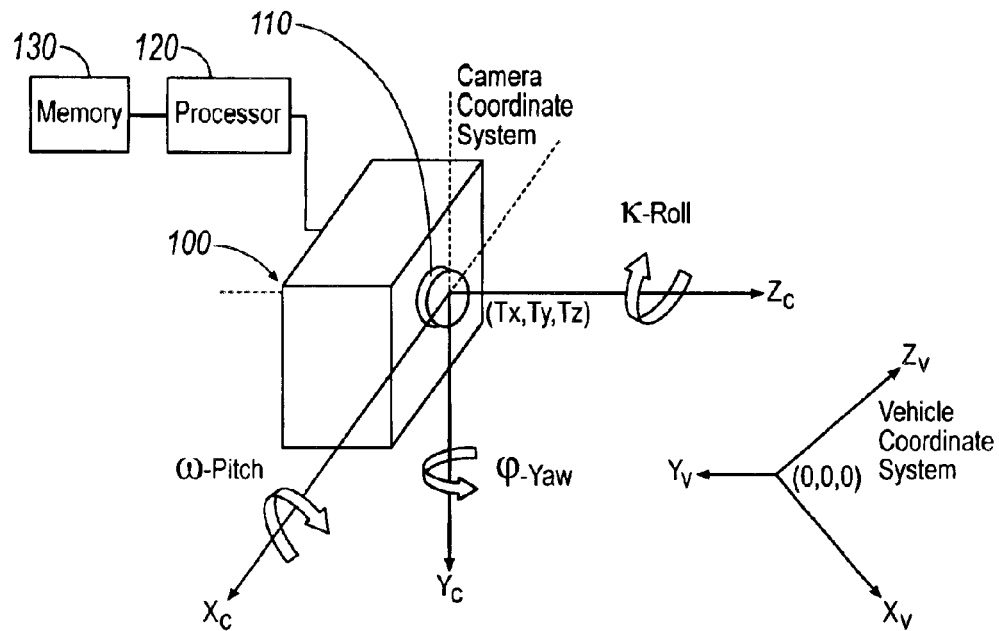
FIG. 1 is a general illustration depicting an example of a vehicle coordinate system, and the translational and angular coordinate systems of a sensor.

The present invention provides for a system and method for automatically calibrating the field-of-view of a sensor (collectively the "sensor calibration system," "calibration system," or simply "the system"). One category of system embodiments relate to vehicle occupancy sensing (VOS) applications. Although many embodiments of the system do not relate to vehicles or vehicle occupants, reference to VOS applications do provide an excellent context for discussion of the calibration system.

Calibration of the sensor's field-of-view is necessary to allow the VOS application (or any other automated application utilizing the sensor calibration system) to account for displacement in the translational position and/or rotational orientation of the sensor, which could otherwise significantly impair the VOS system from functioning properly. In general, this is accomplished by first having the sensor capture an image (a "test image") of an area of space (the "observed area"). In a VOS embodiment of the system, the sensor is preferably a digital video sensor and the observed area is the interior area of the vehicle.

A calibration heuristic can identify and localize prominent features of the observed area, such as distinct or contrasting edges found in the vehicle dashboard, instrument panel and doors (collectively "features"). After these prominent features are identified and isolated in an image of the observed area that is acquired by the sensor, the prominent features can then be evaluated by a process that compares the identified edge features to a set of reference points on a "map" of the observed area. The map is typically an "ideal" observed area with the correct calibration configuration. In many embodiments, the idealized "map" is predefined before installation, taking into consideration the particular operating environment of the system. For example, in a VOS embodiment, the observed area is the interior of the vehicle. During the evaluation process, the reference points are converted over from their three dimensional coordinates provided with respect to an "area" coordinate system (which can also be referred to as a "vehicle" coordinate system in a VOS embodiment) to a set of two dimensional coordinates, corresponding to a pixel location in the digital image, for one particular translational position and rotational orientation of the sensor. This coordinate conversion process can be repeated numerous times, each time presuming a different position and/or orientation of the sensor. The detected edge features within the image can then be compared to the converted reference points for each presumed position and/or orientation of the sensor. Those translational positions and rotational orientations that yield converted reference points that lie closest to the detected edge features can then be selected as potential candidates that more accurately represent the actual position and orientation of the sensor. Each selected position and orientation is then further evaluated by repeating the above process, but at a smaller scale that is centered around the selected position and orientation under evaluation. In this manner, small deviations in the selected position and/or orientation can be evaluated to determine whether a nearby position and/or orientation might better estimate the actual position and/or orientation of the sensor. Repeating this process one or more times subsequently allows for an accurate estimation of the actual translational position and/or rotational orientation of the sensor.

One category of exemplary embodiments of the calibration system will now be described in detail. Note that in this category of embodiments, the sensor field-of-view (FOV) will only be calibrated to account for angular displacements or deviations in the rotational orientation of the sensor. This is typically considered more important than translational displacements of a sensor as deviations in a sensor's rotational orientation tends to more significantly affect its field of view. Other embodiments may focus more heavily on translational displacements, or place equal emphasis on the two types of displacements.

FIG. 1 illustrates a sensor 100 having a wide angle lens 110. The sensor 100 is designed to be mounted within the interior of a vehicle, in a position that places the occupants of the front seats within the expected field-of-view (FOV) of the sensor. A calibration system according to the present embodiment also includes a processor 120 for accepting and processing a variety of input data according to a calibration heuristic that will be discussed in greater detail below. Associated with the processor is one or more types of memory 130 providing permanent storage for a set of reference points used in the calibration process, along with temporary storage of data generated during the calibration process.

As mentioned above, the calibration process relies on the detection of one or more prominent objects or features (collectively "features") of the observed area, such as, for example, the contrasting edges present on the vehicle dash or door of the interior of a vehicle. One example of such a prominent feature, provided for illustrative purposes, is the edge or line that separates the lower, opaque half of the vehicle door from the clear, window portion of the door. Other such examples can include the contours of the dash or seats, which, when viewed from the general direction of the sensor, would be seen as distinct edges between two contrasting regions. Non VOS-embodiments of the system can also rely on a wide variety of different types of features.

In order to associate these detected edge features to the physical world, a set of reference points that identify the physical location of these edge features is required. Each of these reference points can be defined by a set of three-dimensional coordinates (Xv, Yv, Zv) with respect to a "vehicle" coordinate system, as illustrated in FIG. 1. Similarly, a three-dimensional, sensor-based coordinate system (Xc, Yc, Zc) can be used to establish the spatial location of a reference object in relation to the sensor. The origin of the three-dimensional, sensor-based coordinate system is defined with respect to the vehicle coordinate system, and the relationship between these two coordinate systems is assumed to be a known constant. In some embodiments, the "known constant" is predefined before the implementation of the system. In other embodiments, calibration can be performed dynamically against a dynamically created "map" of the observed area.

In general, as illustrated in FIG. 1, the orientation of the sensor coordinate system will typically be different from that of the vehicle coordinate system. The Xc axis and Yc axis of the sensor coordinate system span the standard image plane, where the Xc axis corresponds to the horizontal image axis and the Yc axis corresponds to the vertical image axis. The Zc axis of the sensor coordinate system is perpendicular to the image plane and is defined as having a positive direction along the optical axis of the sensor 100. The system can incorporate a wide variety of different orientation configurations.

In addition to spatial orientation defined by a set of Cartesian coordinates, the position of the sensor can be further defined by its rotational orientation. Specifically, rotation of the sensor is represented in terms of Euler angles ($\omega$, $\phi$, $\kappa$), which define a sequence of three elementary rotations around the Xc, Yc and Zc axes, respectively. As illustrated in FIG. 1, rotation about the three axes is usually prescribed by an amount of pitch (rotation about the Xc axis), yaw (rotation about the Yc axis) and roll (rotation about the Zc axis).

Figure 2:
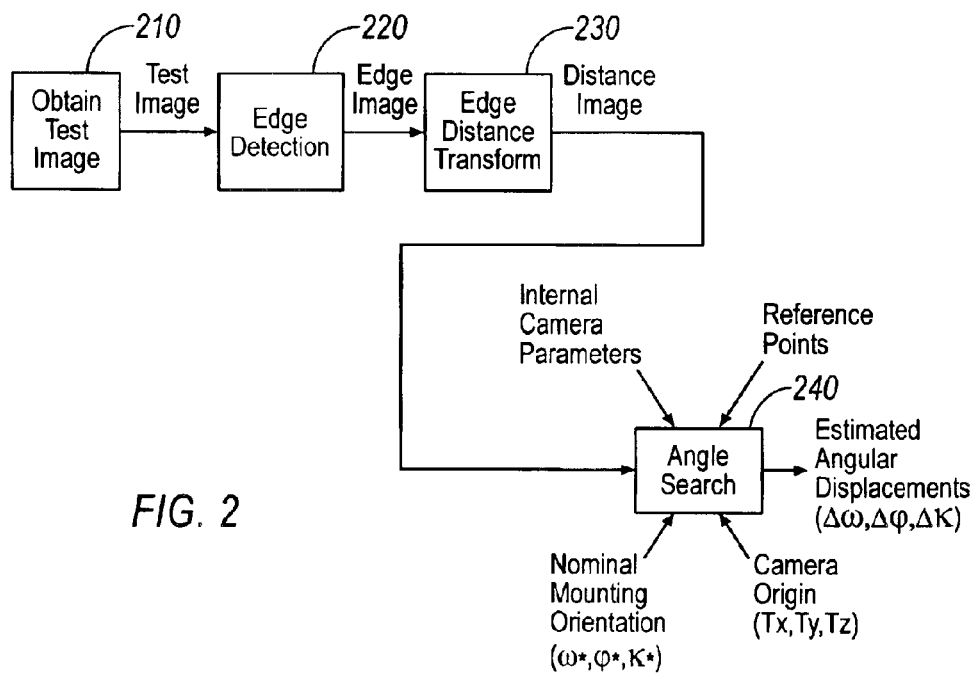
FIG. 2 is a block diagram depicting an example of some basic steps that can be used for calibrating the field of view of a sensor.

Illustrated in FIG. 2 is a block diagram providing a basic overview of some of the steps that can be performed by the calibration heuristic employed by the system. According to the first step 210, a digital test image of the front seating area of the vehicle is obtained by the sensor 100. The image, which can be referred to as a test image, can then be processed at step 220 to detect and isolate certain prominent features of the observed area, such as contrasting edges, that exist as template reference points in the map of the observed area. Upon completion of step 220, the test image is transformed into a digital image that only depicts the prominent features detected by the heuristic, thus becoming, for example, an edge image. Once the edge image is obtained, it can be processed according to a distance transformation step 230. The subsequent distance image produced by the distance transformation step 230 allows for reference points to be easily compared to the detected edges within the image. This comparison occurs at step 240, which utilizes the distance image to search for and evaluate different angles that might better represent the actual rotational orientation of the sensor. Besides the distance image, the angle searching step 240, according to the current embodiment, must be provided with the spatial position of the sensor, provided in Cartesian coordinates, along with the nominal or ideal rotational orientation ($\omega$, $\phi$, $\kappa$) of the sensor upon its installation into the interior of the vehicle. In contrast, according to an alternative embodiment where the field-of-view of a sensor is being calibrated with respect to three angular dimensions and three translational dimensions, angle searching step 240 would need to be provided with the nominal spatial position as well as the nominal rotational orientation of the sensor.

Also utilized at step 240 is a set of reference points that define the three-dimensional locations of the various prominent objects or features of the vehicle interior that step 220 subsequently attempts to identify and isolate in the test image. Lastly, various forms of internal sensor parameter data are required for the processing carried out at step 240. These internal sensor parameters characterize various aspects of the sensor hardware, such as, for example, the lens, focal length and element alignment of the sensor.

Figure 3:
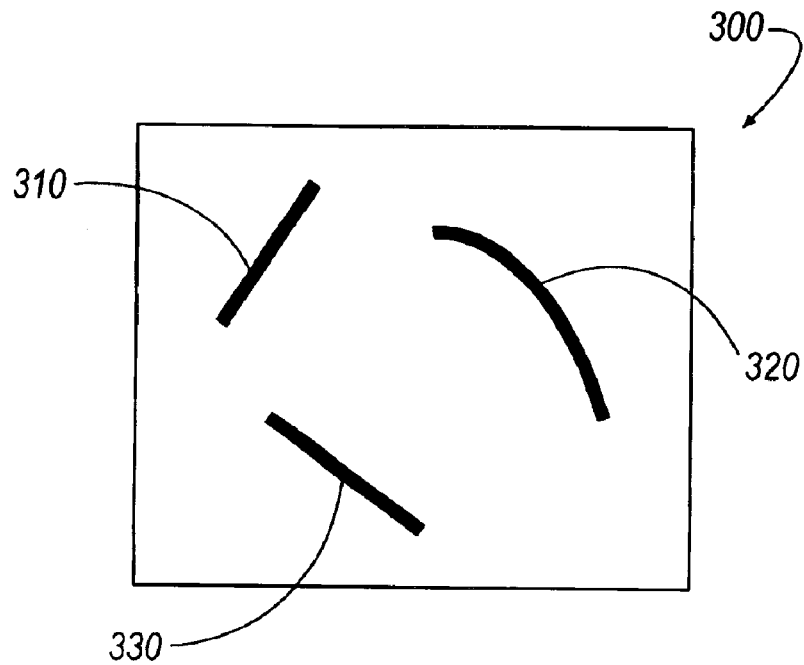
FIG. 3 is a diagram illustrating an example of an edge image generated by the system.

The various steps of the alignment heuristic, as introduced above, will now be discussed in greater detail below. As indicated above, after a test image of the vehicle interior is obtained by sensor 100, the image is processed at step 220 to identify and isolate within the image certain salient features of the observed area, such as a vehicle interior. In many embodiments, these salient features are stationary portions of the vehicle interior identified by the presence of lines or edges that delineate two contrasting regions. These contrasting edges within the test image are identified or highlighted by application of an edge detection process to the entire test image taken by sensor 100. Various edge detection heuristics can be utilized by step 220, including, for example, the Canny Edge Detection technique familiar to those in the image processing arts. Upon its application, the edge detection heuristic isolates and extracts the contrasting edges from the input image and subsequently generates an edge image 300, a simplified example of which is illustrated in FIG. 3. Unlike the test image, edge image 300 is a "binary" image wherein all the depicted objects are represented in the image as, for example, pure black markings upon a white image background. Alternatively, the edge image 300 can be considered to be a collection of pixels that are either placed in a low (i.e., 0) or high (i.e., 1) state. The identified contrasting edges are consequently represented as, for example, a collection of pixels placed in a high state while the remainder of the image consists of pixels placed in a low state. The example edge image 300 of FIG. 3 illustrates this concept, wherein several contrasting edges 310, 320 and 330 identified during the detection step 220 are displayed as black markings upon a white background.

The edge image 300 can undergo further processing at step 230. This further processing includes the application of a distance transformation heuristic, which computes and assigns to each pixel within the edge image 300 a value that represents the distance between that pixel and the nearest pixel that makes up part of one of the identified contrasting edges depicted in the edge image 300. For illustrative purposes, this process can be considered as consisting of two stages. During the first stage, the edge image 300 is partitioned off into a plurality of "cells" based on mathematical principles similar to those utilized to make Voronoi diagrams. Each cell includes one detected contrasting edge, such as, for example, contrasting edge 310 identified in the previous step, along with all the pixels that lie nearer to that one particular contrasting edge than to any other contrasting edge. Accordingly, each cell comprises two identifiable sets of pixels, including a set of edge pixels and a set of non-edge pixels. The edge pixels are those pixels that represent the contrasting edge and, for example, can be considered as a collection of pixels placed in a high state. The low-state pixels surrounding one particular contrasting edge and which lie nearer to that one particular contrasting edge than any other contrasting edge become the non-edge pixels for the cell. Once the image is partitioned off into a plurality of cells, the second stage of step 230 can commence. According to this second stage, the distance between each non-edge pixel and the nearest edge pixel within the same cell can be calculated. A distance metric representing that calculated distance is then assigned to each non-edge pixel within each of the cells of the image.

Figure 4:
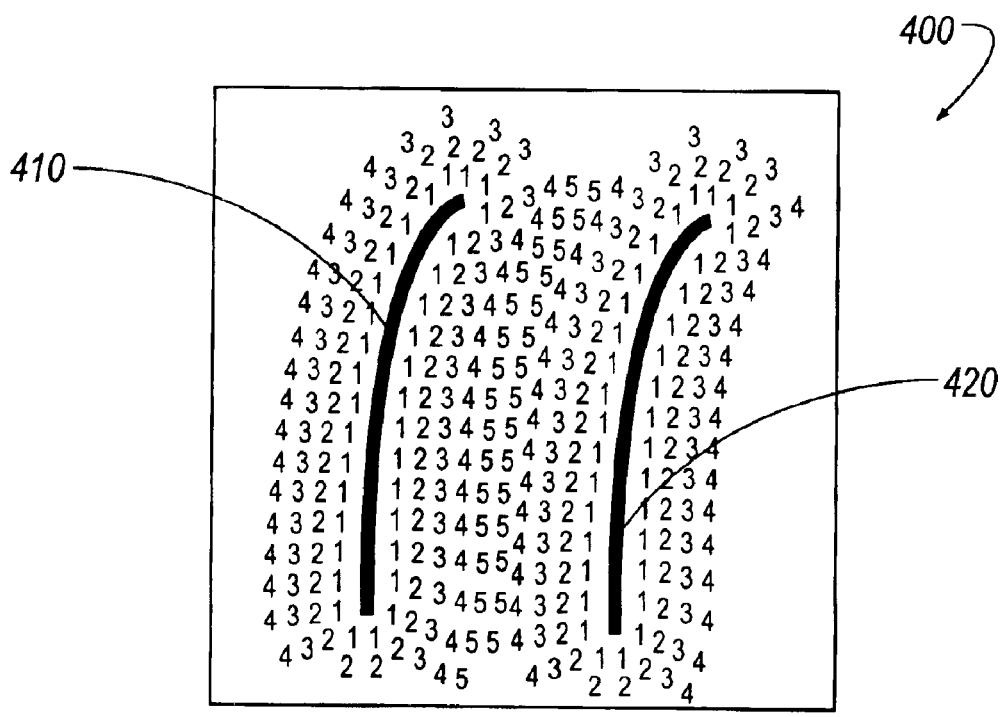
FIG. 4 is a diagram illustrating an example of the principle underlying the distance image.

To further illustrate the above process, consider FIG. 4, which depicts one example of a distance image 400. In this simplified distance image 400, two contrasting edges 410 and 420 are depicted. The numbers surrounding each of the contrasting edges 410 and 420 represent some of the distance values or metrics assigned to each of the non-edge pixels within the image 400. Starting at contrasting edge 410 and traveling in a straight line toward contrasting edge 420, the assigned distance values are seen to initially increase, starting with a value of 1 for the pixel nearest edge 410, and progressing up to a value of 5 for a pixel farthest away from edge 410. The next distance value encountered as one continues on toward edge 420 is another value of 5. This indicates that a new cell has been entered, and that the distance value of 5 is assigned to a pixel associated with the edge at 420, instead of the edge at 410. The distance values then decrease as one moves from one pixel to the next toward edge 420.

Upon generating a distance image 400, the next step 240 can be to conduct an angle search, wherein various rotational orientations or angular displacements are evaluated to determine if one or more of the evaluated angular displacements more accurately represent the actual orientation of sensor 100. As will be discussed in greater detail below, this process involves taking the reference points, which represent the three-dimensional positions of certain prominent features of the vehicle interior, and converting them into two-dimensional coordinates that can be mapped onto the distance image 400. During this conversion process, a set of angle coordinates ($\omega$, $\phi$, $\kappa$) representing one possible rotational orientation of sensor 100 is selected from a pool of such coordinates. The three-dimensional reference points are then converted into a set of two-dimensional points for one particular sensor orientation represented by the selected set of angle coordinates. The result is a set of two-dimensional reference points that indicate the positions of certain prominent features of the vehicle interior if these prominent features were imaged by sensor 100 while the sensor 100 was in a particular rotational orientation, with the particular orientation corresponding to the set of angle coordinates utilized in the conversion process. The set of converted reference points can then be mapped onto the previously generated distance image 400. The mapped locations corresponding to the converted reference points are then compared to the locations of the detected vehicle features as they appear in the uncalibrated distance image 400. The above process is then repeated for each set of angle coordinates present in the pool of coordinates. Different embodiments can involve a wide range of different coordinates.

As indicated above, a plurality or pool of angle coordinate sets (representing a plurality of rotational orientations that sensor 100 may reside in) must be established before the calibration process can begin. This pool of angle coordinate sets is obtained by defining a region of space around the presumed initial orientation of sensor 100. The defined region of angular space is thus seen to be made up of a collection of angle nodes representing possible rotational orientations of sensor 100. Although any rotational orientation can be selected for the presumed initial orientation of sensor 100, the most efficient approach is to presume that sensor 100 was perfectly installed, and thus resides in a nominal or "ideal" orientation. Assuming that the nominal sensor orientation is defined as a complete lack of angular displacement around any of the three axes Xc, Yc and Zc, or, in other terms, having zero pitch, yaw and roll, then the nominal orientation of the sensor becomes (0°, 0°, 0°). As such, according to the current example, the initial candidate angle node is chosen to be the angle node (0°, 0°, 0°), or nominal sensor orientation.

After selection of an initial candidate angle node, a region of space encompassing the candidate angle node must be defined. As previously emphasized, this defined region of rotational angle space represents the most probable orientations in which sensor 100 might reside. The boundaries of this defined region of angle space are chosen so as to represent a presumed maximum magnitude of rotation that sensor 100 may undergo about each of the Xc, Yc and Zc axes. In the current embodiment, these maximum magnitudes of rotation are equivalent to predefined tolerances associated with the placement or installation of sensor 100. Accordingly, if the accepted sensor installation tolerances are, for example, ±5° of rotation about any one axis, then the boundaries of the rotational angle space under evaluation are set at ±5° of rotation about each of the Xc, Yc and Zc axes. The region of rotational angle space that will subsequently be evaluated for possible orientations of sensor 100 can then be indicated in Euler angles as (±5°, ±5°, ±5°).

Figure 5:
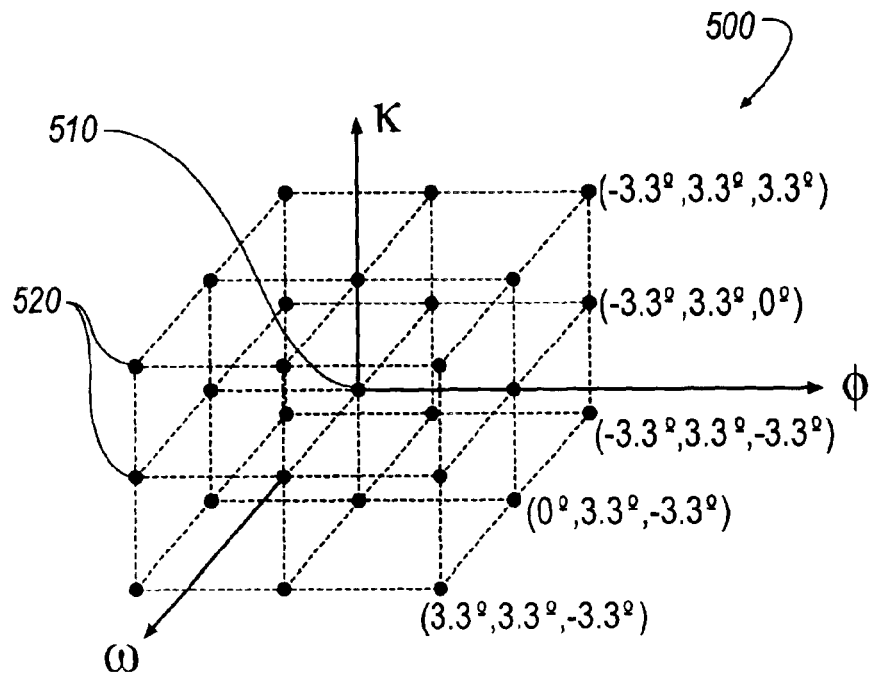
FIG. 5 is a diagram illustrating some examples of the various angular orientations of the sensor that can be presumed and then evaluated.

Illustrated in FIG. 5 is one example of how the rotational angle space discussed above may be graphically represented. In the example of FIG. 5, angle space 500 defines a region of angle space centered about a candidate angle node 510, the candidate angle node 510 being defined as the nominal mounting orientation (0°, 0°, 0°) of sensor 100. According to this example, the boundaries of angle space 500 are established so that angle space 500 includes all possible rotational orientations that lie within ±3.3° of rotation about each of the three axes Xc, Yc and Zc. To simplify the graphical depiction of angle space 500, its boundaries are depicted as spatial displacements along one or more of three axes, each of the three axes corresponding to one of the Euler angles $\omega$, $\phi$ and $\kappa$. In this manner, an angular orientation defined by, for example, 3.3° of yaw and 3.3° of roll would be graphically indicated as a positive displacement of 3.3 units along the $\phi$ axis and 3.3 units along the $\kappa$ axis, thus corresponding to a Euler angle of (0°, +3.3°, +3.3°).

Once a region of angle space is defined, the system can proceed in establishing a plurality of orientations or sets of angle coordinates that will be evaluated as part of the process of estimating the actual orientation of sensor 100. These multiple sets of angle coordinates are obtained by systematically defining one or more sub-nodes that lie within the defined region of angle space under evaluation. Accordingly, each sub-node represents a set of Euler angle coordinates ($\omega$, $\phi$, $\kappa$) defining a point of space within the region of angle space being evaluated, and thus corresponds to one possible rotational orientation in which sensor 100 may reside. An example of this concept is illustrated in FIG. 5, where a plurality of sub-nodes 520 are positioned at equal intervals within angle space 500. Various approaches can be taken in determining both the number and location of the sub-nodes that should exist within a region of space, ranging from a random number and dispersal pattern to a more efficient and logical systematic distribution scheme. For example, according to the present embodiment, as illustrated in FIG. 5, at any particular level of evaluation, angle space 500 is apportioned into a specific number of sub-nodes based on equation 1 listed below:

$$\text{Apportioned Number of Sub-Nodes} = X_{can} * Y_{sub}^3$$

Equation 1. Example of Determining Number of Sub-Nodes where $X_{can}$ equals the number of candidate angle nodes 510 existing at the current level of analysis, and $Y_{sub}$ equals the number of sub-nodes 520 apportioned along any one edge of the region of angle space under evaluation. In the current example illustrated in FIG. 5, $X_{can}=1$ and $Y_{sub}=3$. As a result, angle space 500 of FIG. 5 is apportioned into 27 sub-nodes 520.

Upon having an initially defined region of angle space 500, along with a plurality of established sub-nodes 520, angle searching step 240 can proceed in evaluating each of the sub-nodes 520 to determine if any of the rotational orientations they represent more accurately estimate the actual orientation of sensor 100. This is accomplished by performing, for each sub-node, a series of conversions upon the set of reference points, alternatively referred to as a map, that identifies the various reference objects as located in the three-dimensional, vehicle-based coordinate system. From an information technology standpoint, the map can be implemented in a wide variety of different data structures and processing techniques. This series of conversions first involves transforming each of the reference points so that they are no longer defined by the three-dimensional, vehicle-based coordinate system, but are instead defined by the three-dimensional, sensor-based coordinate system. This is accomplished by taking each reference point coordinate (Xv, Yv, Zv), along with the three rotational angles associated with the currently selected sub-node ($\omega_i$, $\phi_i$, $\kappa_i$), and applying a rigid body transformation to the reference point coordinate. The transformation includes both a translation and a rotation, and is performed, for example, by a matrix equation such as equation 2 depicted below:

$$\begin{pmatrix} Xc \\ Yc \\ Zc \end{pmatrix} = \begin{pmatrix} m11 & m12 & m13 \\ m21 & m22 & m23 \\ m31 & m32 & m33 \end{pmatrix} \begin{pmatrix} Xv \\ Yv \\ Zv \end{pmatrix} + \begin{pmatrix} Tx \\ Ty \\ Tz \end{pmatrix} \quad \text{Equation 2.}$$

External Sensor Model Equation

Equation 2 is referred to as the External Sensor Model because it relates to the external or geometric positioning of sensor 100. The first portion of equation 2, the rotation matrix, accounts for the disparity between the orientation of the vehicle coordinate system and the sensor coordinate system, and involves the following defined elements:

$m11 = \cos(\omega_i)\cos(\kappa_i)$, $m12 = \sin(\omega_i)\sin(\phi_i)\cos(\kappa_i) - \cos(\omega_i)\si(\kappa_i)$, $m13 = \cos(\omega_i)\sin(\phi_i)\cos(\kappa_i) + \sin(\omega_i)\sin(\kappa_i)$, $m21 = \cos(\phi_i)\sin(\kappa_i)$, $m22 = \sin(\omega_i)\sin(\phi_i)\sin(\kappa_i) + \cos(\omega_i)\cos(\kappa_i)$, $m23 = \cos(\omega_i)\sin(\phi_i)\sin(\kappa_i) - \sin(\omega_i)\cos(\kappa_i)$, $m31 = -\sin(\phi_i)$, $m32 = \sin(\omega_i)\cos(\phi_i)$, $m33 = \cos(\omega_i)\cos(\phi_i)$ The second portion of equation 2 is the translation vector (Tx, Ty, Tz), which accounts for the difference between the origin of the sensor-based coordinate system and the vehicle-based coordinate system.

Subsequent to the transformation carried out by equation 2, each reference point is converted over from a standardized, vehicle-based coordinate system to a sensor-based coordinate system that has been adjusted for one particular sensor orientation represented by the selected sub-node. The next step in the conversion process can involve transforming each reference point from its current, three-dimensional, sensor-based coordinates to corresponding two-dimensional, image pixel coordinates (Xp, Yp) while accounting for certain fixed internal parameters of the sensor 100. This is carried out by a series of internal sensor model equations, such as, for example, the three equations provided below:

$$X_n = Xc/Zc, \quad Y_n = Yc/Zc,$$

Equation 3.1 First Internal Sensor Model Equation

Equation 3.1 transforms the three-dimensional, sensor-based coordinates (Xc, Yc, Zc) of a reference point into normalized sensor coordinates by dividing the Xc and Yc components by the Zc component while assuming a standard perspective projection with pinhole sensor geometry.

Due to the use of wide angle lens 110, the test image initially obtained by sensor 100 will be subject to a certain amount of distortion. This distortion is a result of certain inherent properties associated with the use of wide angle lenses, the consequence of which is a greater amount of distortion at the periphery of an image than at its center. Accordingly, the next step in the internal sensor transformations involves taking the normalized sensor coordinates computed in equation 3.1 and adjusting them to take into account these distortions caused by use of a wide angle lens. The following equation 3.2 accomplishes this by applying radial and tangential distortion transformations to generate distorted normalized sensor coordinates for each reference point. Included within equation 3.2 are several fixed sensor parameters, including three radial distortion coefficients Kc(1), Kc(2) and Kc(5) for estimating radial distortion of the image due to use of the wide angle lens, and two de-centering distortion coefficients Kc(3) and Kc(4) that model the tangential distortion that may occur if the centers of the curvature of the lens surfaces are not collinear.

$$\begin{pmatrix} xd \\ yd \end{pmatrix} = \begin{pmatrix} (1 + kc(1)r^2 + kc(2)r^4 + kc(5)r^6)X_n \\ (1 + kc(1)r^2 + kc(2)r^4 + kc(5)r^6)Y_n \end{pmatrix} + \begin{pmatrix} 2kc(3)X_nY_n + kc(4)(r^2 + 2^*X_n^2) \\ 2kc(4)X_nY_n + kc(3)(r^2 + 2^*Y_n^2) \end{pmatrix}$$

Equation 3.2 where $r^2 = X_n^2 + Y_n^2$

Second Internal Sensor Model Equation

The last internal sensor model transformation step, as demonstrated in equation 3.3, accounts for three more types of internal sensor parameters, including: (i) the effective lens focal length fc(1) and fc(2) for both the X and Y coordinates of the image, (ii) the X and Y coordinates cc(1) and cc(2) of the principle point, or intersection of the optical axis with the image plane, assumed to be the center of distortion for a radial lens, and (iii) the skew coefficient (alpha_c) defining the angle between the X and Y pixel axes. Normally the skew coefficient is presumed to equal zero, a valid presumption for typical imaging sensors utilizing rectangular pixels.

$$\begin{pmatrix} xp \\ yp \\ 1 \end{pmatrix} = \begin{pmatrix} fc(1) & fc(1)\text{alpha\_c} & cc(1) \\ 0 & fc(2) & cc(2) \\ 0 & 0 & 1 \end{pmatrix} \begin{pmatrix} xd \\ yd \\ 1 \end{pmatrix} \quad \text{Equation 3.3}$$

Third Internal Sensor Model Equation

Once all the reference points are transformed from their original three-dimensional, vehicle-based coordinates ("3-D reference points") into a two-dimensional, image or pixel-based coordinate system ("2-D reference points"), for one particular orientation represented by the selected sub-node, they can be mapped onto distance image 400. The pixel coordinates of the mapped reference points can then be connected together using straight-line segments so as to reconstruct the edge features that they represent. At this point, distance image 400 can be thought of as containing two sets of contrasting edges, including: (i) the contrasting edges originally isolated from the test image as taken by sensor 100, and (ii) the reconstructed contrasting edges generated through conversion of a set of reference points and subsequently mapped or superimposed onto distance image 400. This latter set of edges reside in distance image 400 at a location where they would normally reside if the image were taken by sensor 100 while the sensor had a rotational orientation equivalent to that represented by the selected sub-node. Based on the distance values previously assigned to the non-edge pixels, an average distance between the actual contrasting edges and the reconstructed edges generated for one particular sub-node or orientation can then be calculated. This is readily accomplished by averaging the distance values assigned to the pixel locations that coincide with the reconstructed edge features. This average distance for the currently selected sub-node can then be recorded, along with the three rotational angles associated with the current sub-node.

The above process is repeated for each established node in the initially defined region of angle space 500. This results in the determination of an average distance measurement for each particular rotational orientation associated with the candidate angle node 510 and each sub-node 520. Consequently, each rotational orientation represented by an established node can be evaluated for its relative accuracy in representing the actual orientation of sensor 100. Specifically, the evaluated orientation that most closely matches the actual orientation of sensor 100 will result in a set of reconstructed edge features that lie nearest to, or have the shortest average distance from, the actual edge features isolated from the test image originally taken by sensor 100 at the beginning of the calibration process. For illustrative purposes, consider the following example based on angle space 500 of FIG. 5. As previously discussed, the orientation of sensor 100 is presumed to be represented by the initial candidate angle node 510, which itself was presumed to be equal to the nominal sensor orientation (0°, 0°, 0°). After the candidate angle node 510 and each sub-node 520 is evaluated by the calibration heuristic, it is determined that one particular sub-node, represented by the orientation (0°, +3.3°, −3.3°), yields a significantly shorter calculated average distance than any other of the nodes. Based on this result, it can be assumed that for this first level of evaluation, the angular orientation (0°, +3.3°, −3.3°) represents a more accurate approximation of the actual orientation of sensor 100 than the originally presumed orientation (0°, 0°, 0°) associated with the initial candidate angle node 510.

In some embodiments of the system, the sensor field of view (FOV) calibration process described above can be reiterated in order to refine the scope of analysis and achieve a greater level of accuracy. Specifically, the scope of the search can be narrowed from the initial predefined angle space to one or more smaller regions of angle space encompassing one or more angular orientations selected for further evaluation. This increases the search resolution, allowing a more accurate estimation of the actual angular orientation of sensor 100.

Reiteration of the calibration process provides for the calibration heuristic to proceed as described above. However, once the angle searching step 240 has completed and an average distance has been calculated for each established node within the initially defined region of angle space 500, one or more of the nodes are selected for further evaluation. This is accomplished by establishing a threshold value for the calculated average distances. All the nodes that yield an average distance below the established threshold are then selected for further evaluation. For illustrative purposes, the following example is provided of how this established threshold value might be calculated. For instance, the threshold value may be established by first determining the shortest average distance calculated in the previous round of evaluations. The threshold value is then set to be equal to this minimum distance ($Distance_{min}$) plus an additional fraction of this minimal distance, as indicated by equation 4:

$$Threshold = Distance_{min} + (Distance_{min} * Z)$$

Equation 4. Threshold Calculation Example where the variable Z represents a fractional value. According to a further embodiment, variable Z need not be a constant, but can instead be a function of the current search level. Thus, for example, the scope of the angle searching process can be decreased with each level of evaluation by decreasing the fractional value that variable Z represents.

Once a threshold value is established, every evaluated node yielding an average distance measurement less than this established threshold value can be selected for further testing. This is carried forth by defining a second level of evaluation, wherein each of the selected first-level nodes becomes a second-level candidate angle node. A region of angle space, smaller than the initial region of angle space defined for the first evaluation level, is then established around each of the newly selected candidate angle nodes. The calibration heuristic is then allowed to proceed as before, conducting a similar angle searching process, but within the smaller confines of the newly defined regions of angle space surrounding each of the second-level candidate angle nodes. The process described above is then repeated a number of times until a desired level of accuracy in the estimated rotational orientation of sensor 100 is achieved. The desired level of accuracy can either be predefined, or calculated dynamically.

Figure 6:
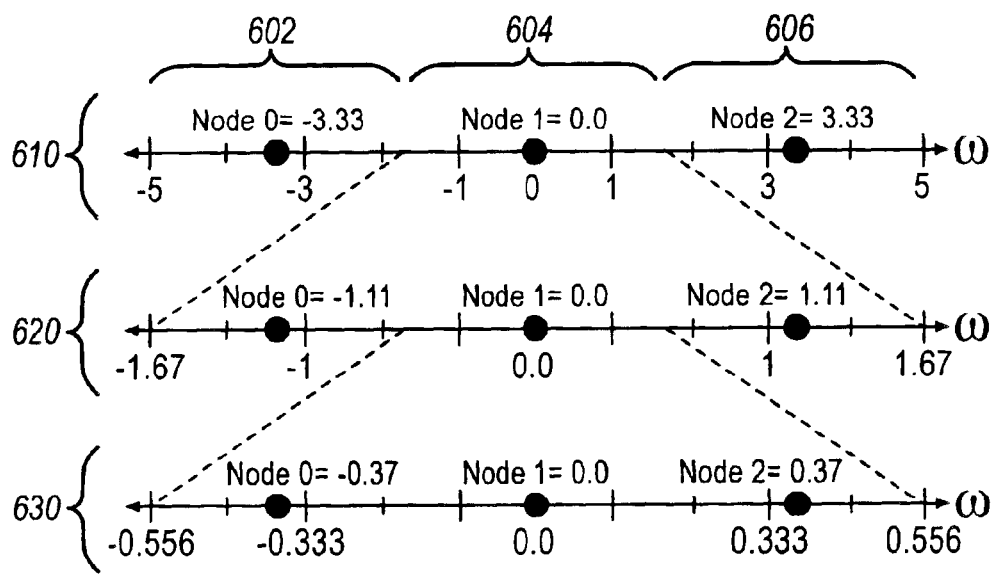
FIG. 6 is a diagram depicting an example of the reiterative process by which a presumed rotational value around one angular axis can be evaluated.

To further illustrate the reiterative process described above, consider the following example depicted in FIG. 6. To simplify the example, the evaluation process is demonstrated in accordance with only one Euler angle. However, it should be understood that in many practical applications, the evaluation process would be conducted in accordance with all three Euler angles ω, φ and κ necessary to define the complete rotational orientation of an object. As depicted in FIG. 6, a first level of evaluation 610 is conducted, wherein several nodes, each representing a different value for angle ω, are assessed. Presume that of the three nodes evaluated, only node 1, residing at ω=0°, yields an average distance measurement below an established threshold value. Node 1 is subsequently selected as a candidate angle node for the second level of evaluation 620. Furthermore, the scope of analysis is reduced from −5°<ω<+5° to a more limited region 604 surrounding the selected node 1. As illustrated in the second level of evaluation 620, the region under assessment has been reduced to −1.67°<ω<+1.67°. Three nodes, each representing a specific value for angle ω, are subsequently assessed for the second level of evaluation 620. Again presume that of the three nodes evaluated, only the average distance yielded by node 1 falls below a specified threshold value. Consequently, node 1 is again selected as a candidate angle node for the third level of evaluation 630, which is defined as an even narrower region around node 1 for subsequent analysis. Upon carrying out the calibration heuristic for the third level of analysis 630, it is determined that node 2, representing ω=+0.37°, best estimates the actual angle ω that the sensor resides in, and that this estimate is now accurate enough to allow proper calibration of the sensor without having to conduct any more levels of evaluation.

According to the above example, only one node was selected at any one time to function as a candidate angle node for a subsequent level of evaluation. However, it should be emphasized that this need not always be the case. More than one evaluated node may resultantly satisfy the threshold requirement necessary for further consideration. As such, any subsequent level of evaluation after the first level can have more than one candidate angle node for which a region of angle space must be defined and evaluated.

As demonstrated by the various examples provided throughout the discussion above, the calibration heuristic of the system requires the selection of one or more candidate angle nodes, each of which represent one particular angular orientation. Subsequently, a region of angle space around each of the candidate angle nodes must be defined. For the first level of evaluation, the boundaries of the initially defined region of angle space are chosen so as to represent a presumed maximum magnitude of rotation that sensor 100 may undergo about each of the Xc, Yc and Zc axes. For instance, according to a prior example, these maximum magnitudes of rotation are set equal to the predefined tolerances associated with the placement or installation of the sensor. However, for subsequent evaluation levels, the defined sub-region of angle space proscribed around any one candidate angle node is much smaller in size than that utilized in the prior level. The size of these subsequent sub-regions of angle space can be established in a multitude of ways. For example, according to one embodiment, the size of the angle space may simply be predefined for each level, decreasing in size the farther one progresses in evaluation levels. Alternatively, the size of the angle space may be dependent on other variables, such as the number of analysis points or sub-nodes established within the defined angle space. One example of such an equation is depicted below:

$$\text{Angle Space Search Neighborhood} = T/\{Y_{sub}^{(EL-1)}\}$$

Equation 5. Determination of Angle Space Example where T represents the magnitude of the boundaries used in the initially defined region of angle space, $Y_{sub}$ equals the number of sub-nodes that are to be apportioned along one edge of the angle space, and EL is the current evaluation level. To illustrate the use of equation 5, consider the example analysis depicted in FIG. 6. According to this example, a first level of analysis 610 for Euler angle $\omega$ is conducted within ±5° of rotation from a central node along the Xc axis. In this instance, the analysis is symmetric as the central node resides at $\omega=0°$. Based on the above information, it is seen that T=5° and $Y_{sub}$=3. As such, for the second level of evaluation 620, the sub-region under analysis is reduced to $5°/3^{(2-1)}=1.67°$. Accordingly, the second level of analysis is conducted within ±1.67° from a centralized node $\omega c$ along the Xc axis. Expanding the example of FIG. 6 to cover all three dimensions, and thus include all three Euler angles, the resultant second level of evaluation would encompass a sub-region of angle space defined as ($\omega c-1.67°<\omega<\omega c+1.67°$, $\phi c-1.67°<\phi<\phi c+1.67°$, $\kappa c-1.67°<\kappa<\kappa c$ 1.67°), where ($\omega c$, $\phi c$, $\kappa c$) represents a centralized node.

The embodiments of the present invention discussed above focus on calibrating the field of view (FOV) of a sensor to correct for angular displacements or deviations in the rotational orientation of the sensor. However, it should be noted that the techniques disclosed above are not limited to estimating angular displacements, but can be readily used to also estimate translational displacements in the positioning of the sensor as well as potentially other forms of displacement. In the case of translational displacements, the calibration heuristic could either be adjusted so as to focus on three dimensional translational space, or, alternatively, expanded so as to focus on both three dimensional angular space and three dimensional translational space. If expanded to cover six spatial dimensions, including three angular and three translational, the calibration system's searching technique could be configured to analyze both angular and translational space simultaneously, or alternatively, sequentially analyze these two spatial dimensions.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method of calibrating a field of view of a sensor within an observable area, comprising the steps of:

defining a reference image of a first observable area having at least one distinctive feature, said reference image defined by a first sensor placed at a base location;

establishing a set of reference points relative to said first sensor that represent a location within said reference image of said at least one distinctive feature;

placing a second sensor in a second observable area that is similar to said first observable area, said second sensor being placed in a location that generally corresponds in position to said base location;

obtaining a test image of said second observable area, said test image obtained by said second sensor and depicting at least one distinctive feature present in said second observable area;

comparing said set of reference points to said at least one distinctive feature depicted in said test image in order to assess a relative accuracy in placement of said second sensor; and transforming said test image into distance image by assigning a location value to every pixel making up said test image, said location value representing a distance between said pixel and said distinctive feature depicted in said test image that lies closest to said pixel;

mapping said set of reference points onto said distance image for at least one possible orientation of said second sensor, said at least one orientation residing in a defined region of space; and calculating an average distance between said at least one distinctive feature depicted in said test image and said set of mapped reference points, said calculated average distance representing a relative level of accuracy between a presumed orientation of said second sensor and an actual orientation of said second sensor.

2. The method according to claim 1, wherein said first observable area and said second observable area are duplicate environments.

3. The method according to claim 1, wherein said at least one distinctive feature in said first observable area and said at least one distinctive feature in said second observable area represent identical physical features.

4. A method of calibrating a field of view of a sensor within an observable area, comprising the steps of:

obtaining a test image of the observable area, said test image comprising a plurality of pixels;

transforming said test image into a distance image by assigning a location value to each pixel within said test image, said location value representing a distance between said pixel and a distinctive feature that lies closest to said pixel;

mapping at least one set of reference points, representing an ideal location of said at least one distinctive feature, onto said distance image for at least one possible orientation of said sensor, said at least one orientation residing in a defined region of space;

calculating an average distance between said at least one distinctive feature in said distance image and said at least one set of mapped reference points, said calculated average distance representing a relative level of accuracy between said presumed orientation of said sensor and an actual orientation of said sensor.

5. The method according to claim 4, wherein said orientation includes an angular position of said sensor, said angular position representing said orientation of said sensor along three angular axes of rotation.

6. The method according to claim 4, wherein said at least one distinctive feature comprises at least one contrasting edge in the interior of a vehicle.

7. The method according to claim 6, wherein said at least one contrasting edge is part of a window frame, vehicle door or vehicle dashboard.

8. The method according to claim 4, wherein said defined region of space represents a tolerance associated with sensor placement.

9. The method according to claim 8, wherein said sensor placement tolerance accounts for both discrepancies induced in said orientation of said sensor during said sensor's installation, and discrepancies subsequently induced in said orientation of said sensor during operation of a vehicle.

10. The method according to claim 4, wherein said at least one set of reference points is mapped to said distance image for a predetermined number of orientations within said defined region of space.

11. The method according to claim 4, further comprising the steps of:

selecting at least one of said at least one possible orientations of said sensor that yields a corresponding calculated average distance, between said at least one distinctive feature in said distance image and said at least one set of mapped reference points, below a predetermined threshold;

defining a sub-region of space around each of said selected orientations;

mapping said at least one set of reference points onto said distance image for at least one possible sub-regional orientation of said sensor, said at least one sub-regional orientation residing in one of said defined sub-regions of space;

calculating an average distance between said at least one distinctive feature in said distance image and said at least one set of mapped reference points for each of said at least one possible sub-regional orientations of said sensor; and presuming said sub-regional orientation that yields the lowest calculated average distance to represent an approximation of said actual orientation of said sensor.

12. The method according to claim 11, wherein said steps of claim 8 are reiterated one or more times, wherein each time a new region of space, smaller in size than previous regions defined in a prior iteration of said steps, is defined around one or more selected orientations.

13. A vehicle occupancy sensing (VOS) system, comprising:

a digital sensor mounted within a vehicle in such a manner as to be able to generate an image of an interior of the vehicle;

a processor in communication with said sensor and capable of analyzing said image generated by said sensor in accordance with at least one heuristic; and memory in communication with said processor and capable of storing data generated by said processor, wherein said at least one heuristic includes a calibration heuristic that instructs said sensor to generate an image of the vehicle interior and said processor to identify and isolate within said image at least one distinctive feature of the vehicle interior, whereupon said processor compares an image location of said at least one distinctive feature to at least one set of reference points for a plurality of different presumed sensor positions, said comparison yielding the closest set of reference points for said presumed sensor position that best estimates an actual position of said sensor.

14. The vehicle occupancy sensing system of claim 13, wherein said at least one distinctive feature of the vehicle interior comprises a contrasting edge.

15. The vehicle occupancy sensing system of claim 13, wherein said calibration heuristic is automatically carried out on a periodic basis.

16. The vehicle occupancy sensing system of claim 13, wherein said calibration heuristic is carried out when the vehicle has no occupants.

17. The vehicle occupancy sensing system of claim 13, wherein said calibration heuristic is carried out right before the vehicle is powered down.

18. The vehicle occupancy sensing system of claim 13, wherein said sensor position includes at least a translational position of said sensor.

19. The vehicle occupancy sensing system of claim 13, wherein said sensor position includes at least a rotational orientation of said sensor.

20. The vehicle occupancy sensing system of claim 13, wherein said calibration heuristic is repeated at least once with an increased level of accuracy compared to a previous run of said calibration heuristic.

21. A method of calibrating a field of view of a sensor for a vehicle occupancy sensing system, comprising the steps of:

generating a digital image of an interior of the vehicle;

identifying within said image at least one distinctive feature of the vehicle interior, said at least one distinctive feature appearing in the image as an edge existing between two regions of differing contrast;

comparing within said image a location of said at least one identified distinctive feature to at least one set of reference points, said at least one set of reference points adjusted for one particular position of the sensor and representing an ideal location of said at least one distinctive feature for said particular sensor position;

repeating said comparison step a plurality of times, each time adjusting said at least one set of reference points for a different particular position of the sensor; and determining which particular position of the sensor yields at least one set of adjusted reference points that most closely match said location of said at least one identified distinctive feature, said determined particular position estimating an actual position of the sensor.

22. The method according to claim 21, wherein said position of the sensor represents a three-dimensional translational location of the sensor.

23. The method according to claim 21, wherein said position of the sensor represents a three-dimensional rotational orientation of the sensor.

24. The method according to claim 21, wherein said at least one distinctive feature is part of a window frame, vehicle door or vehicle dash.

25. The method according to claim 21, wherein all of said different particular positions of the sensor, to which said at least one set of reference points are adjusted to, lie within a predefined region of space.

26. The method according to claim 25, wherein said predefined region of space is based upon specified mounting tolerances in said position of the sensor.

27. The method according to claim 21, further comprising the steps of:

comparing within said image said location of said at least one identified distinctive feature to said at least one set of reference points, said at least one set of reference points re-adjusted for one particular sub-position of the sensor, said sub-position based upon said previously estimated actual position of the sensor;

repeating said comparison step a plurality of times, each time adjusting said at least one set of reference points for a different particular sub-position of the sensor; and determining which particular sub-position of the sensor yields at least one set of adjusted reference points that most closely match said location of said at least one identified distinctive feature, said determined particular sub-position representing a more accurate estimate of said actual position of the sensor.

* * * * *